Jan. 5, 1926.  1,568,295
J. A. SCHLEICHER
LOCKING DEVICE FOR DEPTH GAUGE MICROMETERS
Filed July 17, 1925
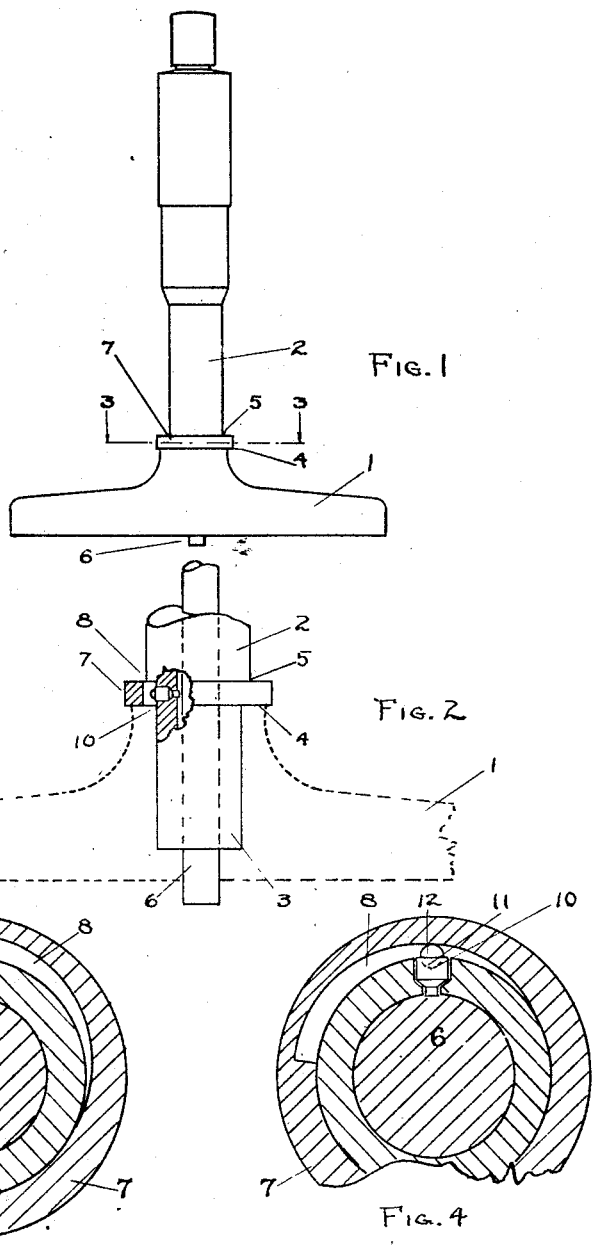
INVENTOR
John A. Schleicher
BY
George B. Willcox
ATTORNEY Patented Jan. 5, 1926.

1,568,295

UNITED STATES PATENT OFFICE.

JOHN A. SCHLEICHER, OF SAGINAW, MICHIGAN, ASSIGNOR TO LUFKIN RULE CO., OF SAGINAW, MICHIGAN, A CORPORATION OF MICHIGAN.

LOCKING DEVICE FOR DEPTH-GAUGE MICROMETERS.

Application filed July 17, 1925. Serial No. 44,395.

*To all whom it may concern:*

Be it known that I, JOHN A. SCHLEICHER, a citizen of the United States, residing at Saginaw, in the county of Saginaw and State of Michigan, have invented certain new and useful Improvements in Locking Devices for Depth-Gauge Micrometers; and I do hereby declare the following to be a full, clear, and exact description of the invention, such as will enable others skilled in the art to which it appertains to make and use the same.

This invention is a locking device for depth gauge micrometers, whereby the depth measuring spindle can be clamped to prevent its being accidentally moved from its adjusted position while the micrometer reading is being taken or while the instrument is being handled.

An object of my improvement is to provide a spindle lock of such construction that the locking mechanism can not become accidentally detached from the micrometer, as occurs with devices now in common use, wherein the parts of the lock proper are held in assembled position by certain members of the micrometer head which can be detached by unscrewing. In my improved construction such derangement of the locking mechanism can not take place.

To accomplish the object mentioned I have so arranged the parts of the locking device that they are operatively mounted close to the shoe, in fact, at the junction of the graduated barrel or micrometer head and the shoe. The graduated barrel is secured to the shoe permanently, as by a force fit instead of by a screw connection. The locking device, which is on a reduced part of the barrel, can not, therefore, become detached by any ordinary hand manipulation or by unscrewing the usual micrometer assembly.

Another object is to provide a locking device that is positive in its operation, yet simple in construction and of such shape that it can be conveniently located with respect to the shoe and the graduated barrel, as above stated. The position of the user's hands in taking a depth gauge measurement need not be changed to lock the spindle after the desired micrometer adjustment has been made. Heretofore it has usually been necessary, after the operator has made the depth adjustment, to change the position of his hands, altering his hold upon the instrument in order to operate the lock and to take the reading. This shifting frequently changed the reading of the instrument. With my improvement the user not only can read the micrometer, but can also lock the spindle without changing his hold, and consequently operates with minimum risk of disturbing the micrometer adjustment.

A still further object is to produce a locking device that consists of only three movable parts, capable of being manufactured and assembled cheaply, and adapted to clamp and unclamp the spindle without producing any tendency to move the spindle either lengthwise or by rotation when the clamp is operated.

With the foregoing and certain other objects in view, which will appear later in the specifications, my invention consists in the devices described and claimed and the equivalents thereof.

In the drawings, Fig. 1 is a side view of a depth gauge micrometer embodying my improvement.

Fig. 2 is a part sectional longitudinal view.

Fig. 3 is an enlarged cross section on the line 3—3 of Fig. 1, showing the locking device in released position.

Fig. 4 is a similar view showing the spindle clamped.

As is clearly shown in the drawings, the micrometer consists of the usual shoe 1 carrying the micrometer head or barrel 2 having the customary graduations.

The lower end 3 of the micrometer head is of reduced diameter and is secured in a hole in the shoe 1 by a force fit, so that the head can not be unscrewed or otherwise manually detached from the shoe 1.

Between the top face 4 of the shoe and the shoulder 5 of the barrel is the spindle-locking device comprising my present improvement.

The spindle 6, when projected through the lower face of the shoe by means of the micrometer head, may be locked in position by slightly turning the knurled ring 7. The construction is shown in Figs. 3 and 4. The ring is bored to loosely fit over the reduced lower end 3 of the micrometer head 2, and one part 8 of the bore is made eccentric. The wall of the reduced end 3 of head 2 has a radial hole 9, in which is loosely received a small cylindrical plug 10, preferably of brass.

The inner end of the plug can be forced into frictional engagement with the spindle 6 by means of eccentric bore 8, as shown in Fig. 4 when ring 7 is rotated.

Preferably the outer end of plug 10 is cupped as at 11 and a steel ball 12 is loosely received in the cup so as to be engaged by the inner wall of the eccentric bore 8. The force of eccentric 8 is wholly exerted in a radial direction. Any sidewise thrust that might otherwise cause displacement or tilting of the plug when the ring is rotated to its clamped position is eliminated by the loose ball joint interposed between the eccentric and the plug.

By the means above described I have produced a simple and inexpensive, yet reliable clamping device for the spindle of a micrometer, and one that is not likely to get out of order. It is also incapable of being disarranged when the micrometer head is disassembled by the owner. By its construction the locking device is adapted to be used in that location on the micrometer where it can best be operated without obstructing the user's view of the micrometer reading, and rendering it unnecessary to change the position of the hands in order to perform both functions, viz. adjusting the micrometer and locking the spindle.

A form of anvil adapted to perform the functions of the plug and ball of the present device, and in addition adapted to be moved away from and held out of contact with the spindle is shown in my co-pending application, Serial No. 44,396 filed July 17, 1925.

Having thus described my invention, what I claim and desire to secure by Letters Patent is:

1. In a depth gauge micrometer including a shoe and a micrometer head having a part of reduced diameter secured to said shoe, a spindle slidable in said reduced part and an internally eccentric ring revolvable thereon, a movable plug in the wall of said reduced part, between the spindle and eccentric ring, for the purposes set forth.

2. In a depth gauge micrometer including a shoe and a micrometer head having a part of reduced diameter secured to said shoe, a spindle slidable in said reduced part and an internally eccentric ring revolvable thereon, a movable plug in the wall of said reduced part, between the spindle and eccentric ring, the outer end of said plug cupped, and a ball loosely received therein, for the purposes set forth.

In testimony whereof, I affix my signature.

JOHN A. SCHLEICHER.